Figure 1:
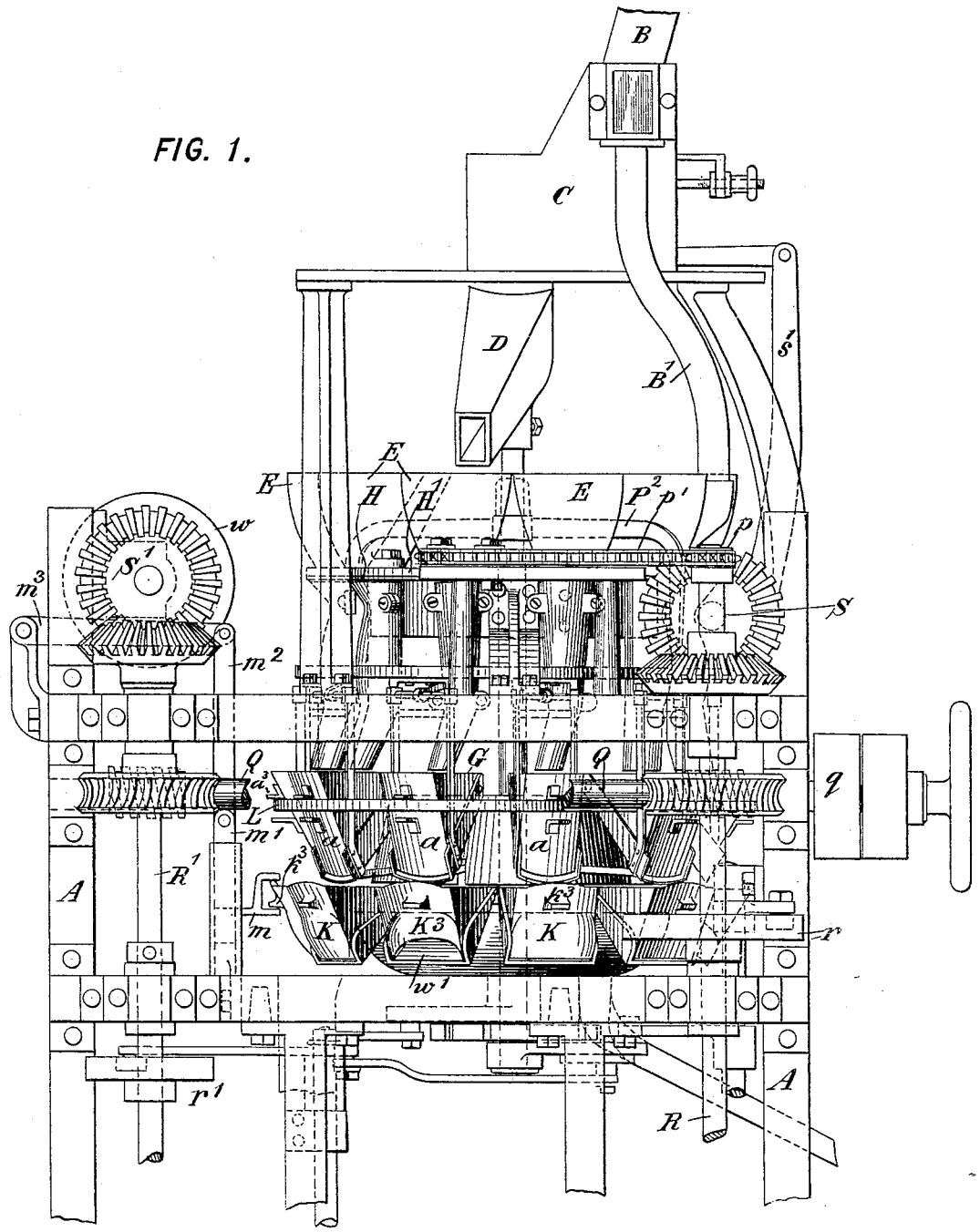

(No Model.)
4 Sheets—Sheet 2.

H. E. SMYSER.
AUTOMATIC WEIGHING MACHINE.

No. 493,797.
Patented Mar. 21, 1893.

WITNESSES:
John Becker
Fred White

INVENTOR:
Henry E. Smyser,
By his Attorneys,
Arthur E. Fraser & Co.

(No Model.) 4 Sheets—Sheet 3.
H. E. SMYSER.
AUTOMATIC WEIGHING MACHINE.

No. 493,797. Patented Mar. 21, 1893.

WITNESSES:
John Becker
Fred White

INVENTOR:
Henry E. Smyser,
By his Attorneys,
Arthur E. Fraser & Co.

(No Model.)  4 Sheets—Sheet 4.

H. E. SMYSER.
AUTOMATIC WEIGHING MACHINE.

No. 493,797.  Patented Mar. 21, 1893.

WITNESSES:
John Becker
Fred White

INVENTOR:
Henry E. Smyser,
By his Attorneys,
Arthur G. Fraser & Co.

UNITED STATES PATENT OFFICE.

HENRY E. SMYSER, OF PHILADELPHIA, PENNSYLVANIA, ASSIGNOR TO ARBUCKLE BROTHERS, OF NEW YORK, N. Y.

AUTOMATIC WEIGHING-MACHINE.

SPECIFICATION forming part of Letters Patent No. 493,797, dated March 21, 1893.

Application filed August 15, 1892. Serial No. 443,160. (No model.)

*To all whom it may concern:*

Be it known that I, HENRY E. SMYSER, a citizen of the United States, residing at Germantown, in the city and county of Philadelphia and State of Pennsylvania, have invented certain new and useful Improvements in Automatic Weighing-Machines, of which the following is a specification.

This invention relates to machines for automatically dividing material into charges of a given weight.

My present invention is most directly an improvement upon the construction of automatic weighing machine disclosed in my application for patent filed April 15, 1891, Serial No. 389,030. The automatic weighing machine described in that application comprises a series of weighing scales arranged preferably in circular order, a receiving chute or receptacle for each scale-pan, and a measuring device for measuring out charges of the material to be weighed somewhat less than the full weight desired and deposit these charges in said receptacles in succession. The receptacles are thus filled with the measured charges one after another, and when all are filled the receptacles are dumped simultaneously to transfer their charges to the scale-pans, whereupon the operation of the scales commences, each scale being fed with a small stream of the material to be weighed out from a feeding box or hopper, the stream thus fed to the scale being delivered to it in such manner that the feed is cut off upon the descent of the scale-pan under its full weight, this being done preferably by introducing the stream through a feeding chute so connected to the scale-beam that when the beam is raised by the excessive weight of the counterpoise the chute discharges into the scale-pan, but when the beam is depressed by the descent of the scale-pan the chute is deflected so as to discharge the material outside of the pan. The several scales thus complete their full weights simultaneously while the receptacles above them are being refilled, and are finally simultaneously dumped into carriers arranged beneath them, which in turn are discharged successively one after another down a suitable spout. In the construction of machine illustrated in said application, the receiving chutes or receptacles over the scale-pans are constructed each with a tilting gate near its bottom, and with mechanism for simultaneously opening and closing the gates of the several receptacles in order to dump them or discharge their contents into the scale-pans beneath, and thereupon to immediately reclose them preparatory to their receiving the next successive charges. My present invention provides an improvement upon this construction whereby the mechanism is greatly simplified. Instead of providing each receptacle with a tilting gate or trap-door to close its bottom, I provide a single false bottom for the entire series of receptacles, this false bottom consisting of a sliding plate having perforations in it adapted in one position of the plate to register with the bottoms of the receptacles, and in the opposite position of the plate to be out of register therewith in order to close their bottoms, the plate being given at intervals reciprocating movements from one position to the other and back. The receptacles being preferably arranged in a circular series, the sliding plate is made in the form of a ring suitably guided or mounted so as to permit of its oscillating or sliding around the circle to a sufficient extent to bring its openings into and out of register with the receptacles.

My improved weighing apparatus is shown in the accompanying drawings, wherein—

Figure 2:
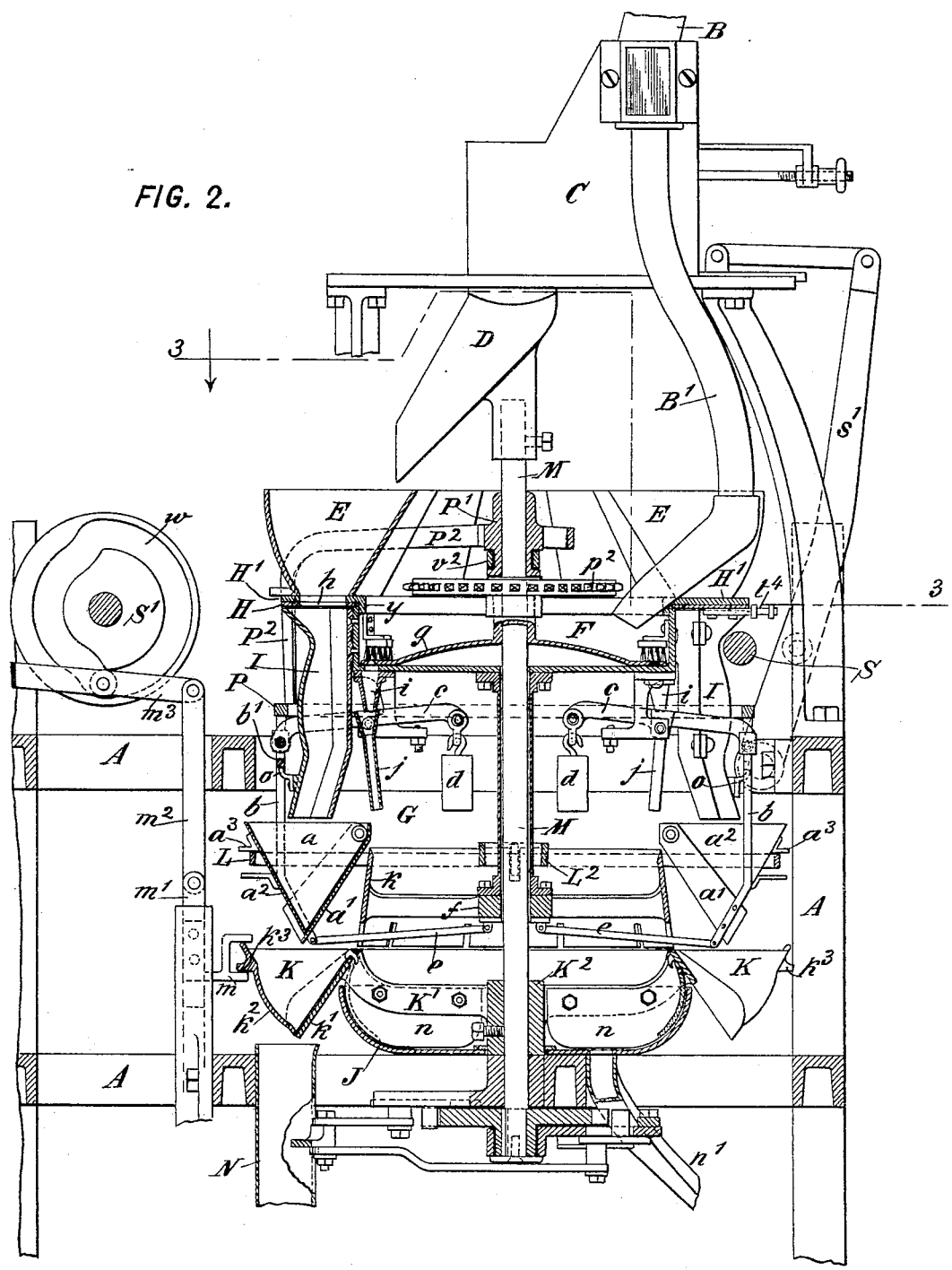
Figure 3:
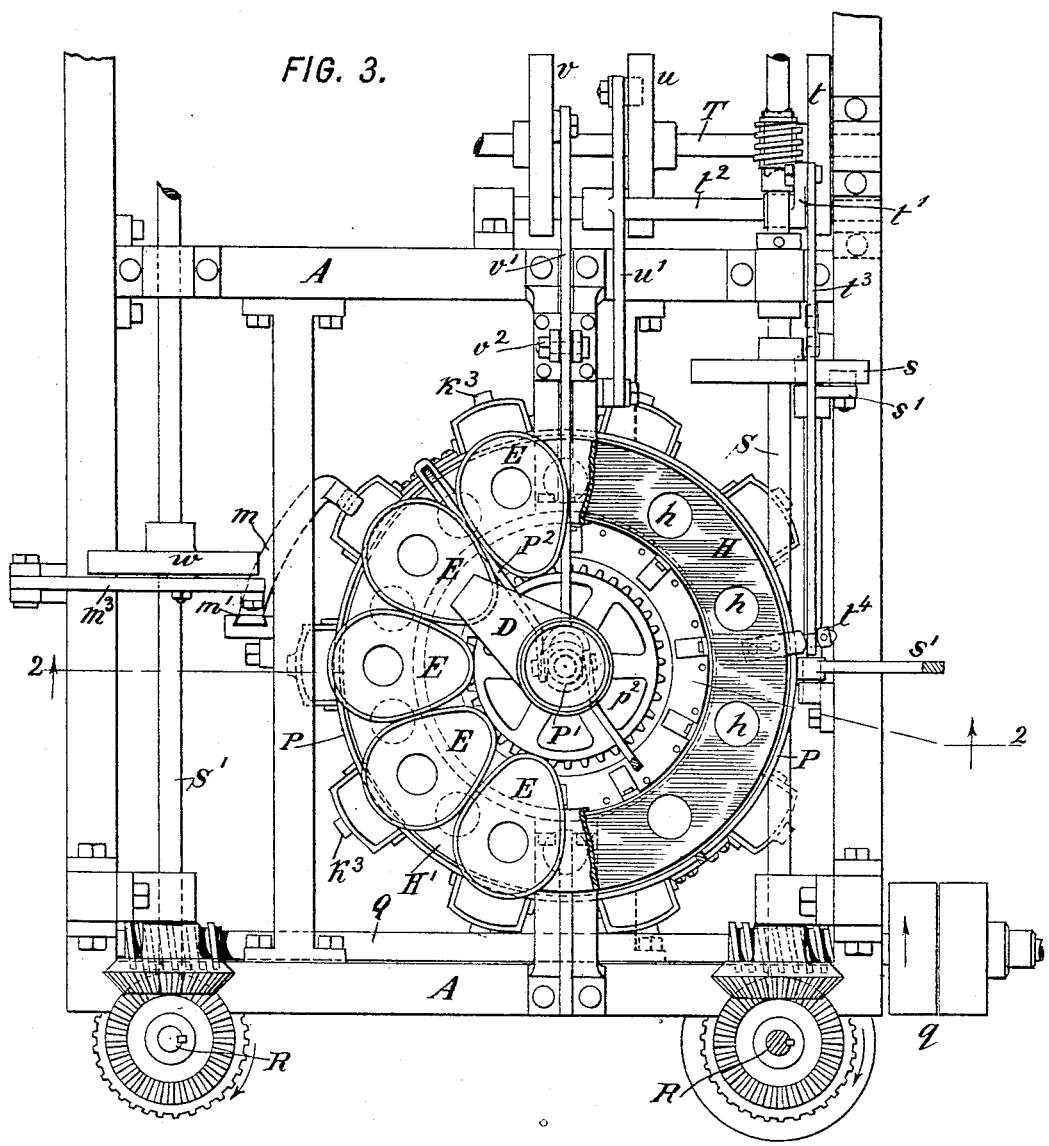
Figure 4:
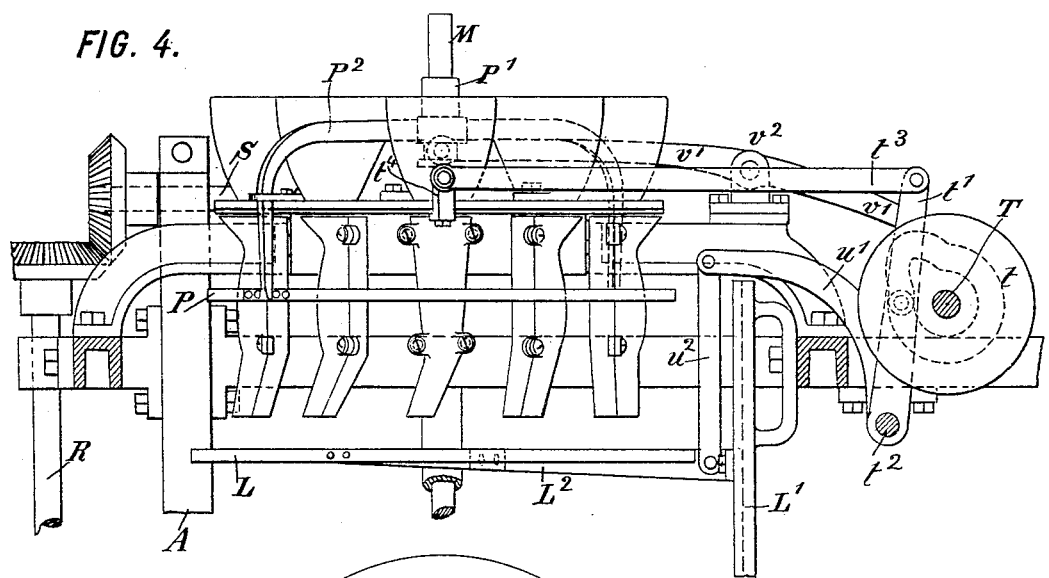
Figure 5:
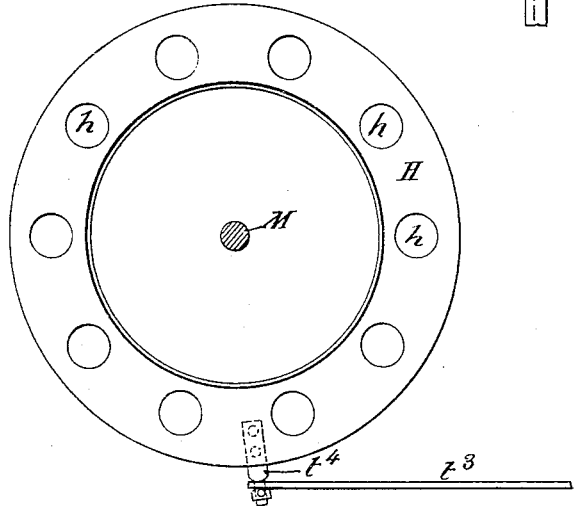
Figure 6:
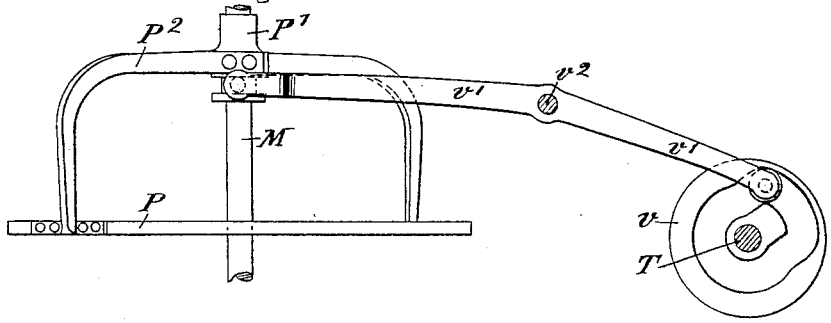

Figure 1 is a rear end elevation of the machine. Fig. 2 is a vertical mid-section thereof looking in the same direction as Fig. 1, and cut approximately in the planes of the line 2—2 in Fig. 3. Fig. 3 is a horizontal section cut approximately in the planes of the line 3—3 in Fig. 2. Fig. 4 is a fragmentary side elevation viewed from the right-hand side of the machine and partly in vertical section, the outer members of the frame being removed. Fig. 5 is a plan of the annular slide. Fig. 6 is a side elevation of the stop-ring and the mechanism for operating it isolated from the other parts.

Referring to the drawings, let A designate the supporting frame of the machine, and B a chute through which material to be divided into weighed charges is delivered. The material descends into a measurer C, by which successive charges are measured out in bulk and delivered through an intermittently rotating chute or spout D into one after another of a series of receiving pockets or receptacles E E, the chute D moving after each discharge from one receptacle to the next. A branch chute B' conveys the overflow from the measurer C and discharges it into a feeding box or hopper F (Fig. 2).

G G are the weighing scales, equal in number to the receptacles E E, and in the construction shown arranged with a stationary mounting so that they do not revolve. Each scale consists (see Fig. 2) of a scale-pan $a$ hung by hangers $b$ from the scale-beam $c$, to the opposite arm of which is attached a counterweight $d$. To prevent the swinging of the scale-pan, the lower end of the hanger $b$ is connected by a link $e$ to a stationary hub $f$.

The open bottoms of the several receptacles E E are normally closed by means of a sliding plate H until the last of the receptacles is filled, whereupon this plate is moved to bring its perforations $h$ $h$ into register with the bottoms of the receptacles, whereby the charges of material are dumped from the several receptacles, dropping through chutes or spouts I I leading down therefrom to the respective scale-pans. The receptacles E and spouts I are stationary. The several scales after being thus supplied with measured charges, are thereupon supplied with an additional or supplemental feed of the material to be weighed from the feed hopper F until each scale-pan has received its full weight, whereupon this feed is cut off from it. In the construction shown, (see Fig. 2) the feed hopper F consists of a cylindrical box in which turns a continuously revolving feed-plate $g$ having perforations in its outer portion or rim which become filled with the material in the box F, and as the plate revolves pass over openings in the outer part of the bottom of the box which register with chutes $i$ $i$ through which the material falls into chutes $j$ $j$ carried by or connected to the respective scale-beams so that they tilt with the beams. In the position assumed by each beam before receiving its full weight, that is to say, when the counterpoise $d$ overbalances the weight in the scale-pan, the bottom end of the chute $j$ opens into the pan and discharges thereinto the stream of material fed from the hopper F until the pan receives the full weight, whereupon by its descent and the consequent tilting of the scale-beam, the chute $j$ is deflected to the position shown in Fig. 2, so that it discharges outside the scale-pan, and through a casing $k$ into a receptacle J beneath.

The several scales perform the weighing simultaneously, and after all have received the full weight, they are simultaneously dumped into a corresponding series of receptacles or carriers K K beneath them. To facilitate the dumping of the scales, their pans $a$ are constructed each with an inclined bottom $a'$ hung from the hangers $b$, and with a movable body $a^2$ hinged to the upper part of the bottom so that it can be lifted away from the lower side of the inclined bottom to permit the contents to slide out between. The pivoted bodies of the several scale-pans are lifted by a ring L which at predetermined intervals moves upward engaging fingers $a^3$ projecting from the several scale-pans and lifting them to dump the pans.

The carriers K K are mounted upon arms K' K' radiating from a hub $K^2$ fixed on an intermittently rotating central shaft M, so that the carriers are revolved intermittently and come successively over a discharge chute N (Fig. 2). The carriers are constructed preferably in the same manner as the scale-pans, that is to say, with a fixed inclined bottom $k'$ and a hinged body $k^2$ which is lifted to dump the carrier. As each carrier reaches the position over the chute N, it is dumped by an arm $m$ so located that in this position it stands beneath a projection $k^3$ on the movable body $k^2$, the arm $m$ being given a rising movement sufficient to lift the movable body and dump the carrier so that its contents fall through the chute N. The material falling from the several chutes $j$ $j$ outside the scale-pans into the receptacle J is swept therefrom by blades $n$ $n$ carried by the arms K' and discharged down a chute $n'$.

The intermittently-rotating shaft M carries the carriers K K and spout D. It is rotated by any suitable mechanism for imparting intermittent rotary motion, preferably by the mechanism described in my said application Serial No. 389,030. The extent of its movements corresponds to the number of scales employed; thus in a machine having ten scales, ten receptacles E E, and ten carriers K K, the shaft will at each movement advance one-tenth of a revolution. As each of the scale-pans descends under its full weight, it is stopped by a cross-bar $b'$ on its hanger $b$ striking a fixed stop $o$, which may be conveniently mounted on the chute I (see Fig. 2). To prevent the stress of the counterpoise $d$ from throwing the scale-pan violently upward at the moment when it is dumped, a movable stop, conveniently constructed as a ring P is provided which, just prior to the simultaneous dumping of the scales, descends and presses down the several hangers $b$ into firm contact with the stops $o$, the ring P remaining in its lowest position during the dumping, and thereby preventing the sudden flying up of the scale-pans which would otherwise result. The ring P remains in this position for a moment, and until by the movement of the slide H the several receptacles E E begin to discharge their contents into the scale-pans, thereby preventing the shock due to the sudden dropping of this weight into the pans throwing the pans down and setting the scale-beams to rocking. The pans are thus held stationary while being emptied, and for more or less of the time while being refilled, or even during the pouring in of the new charge, the ring P slowly rises, permitting the scale-pans to ascend gently until a position of equipoise is reached, whereupon the operation of automatic weighing commences by the feeding into the pans through the chutes $j$ of the supplemental stream of material to be weighed.

The machine is driven from a belt running on a pulley $q$ on a driving shaft Q, which through worm-gearing drives upright shafts R and R'. These in turn through bevel-gearing drive horizontal shafts S and S'. The shaft S through worm-gearing drives a shaft T arranged transversely parallel with the driving shaft Q. The shafts R R' and S S' execute one revolution to each completed weighing operation, that is, to each dumping from the measurer C, and to each dumping from the carriers K. The shaft T executes one revolution to each dumping from the receptacles E and scales G; that is to say, in a machine having ten scales it revolves at one-tenth the speed of the shafts R, S. The shafts R R' carry cams $r\ r'$ which actuate the mechanism for intermittently propelling the shaft F. The shaft R carries a sprocket-wheel $p$ which through the medium of a drive-chain $p'$ passing over a sprocket-wheel $p^2$ fixed to the feed-disk $g$, imparts a continuous rotation to this disk. The shaft S carries a cam $s$ which actuates a lever $s'$ by which the intermittent movements or reciprocations are imparted to the measurer C. There is no novelty in the construction of this measurer, which consists of a measuring box of the same construction shown in my said application Serial No. 389,030.

The shaft T carries a cam $t$ (see Fig. 4) having a sinuous groove into which projects a roller carried on a lever $t'$ turning on a shaft $t^2$, this lever being connected by a connecting rod or link $t^3$ with an arm $t^4$ fixed to and projecting from the ring-shaped slide H by which the receptacles E E are closed or opened. The groove in the cam $t$ is constructed in the last tenth of its rotation to reciprocate the slide H until its holes $h\ h$ register with the bottoms of the receptacles E E, and dwelling in this position long enough to permit the contents of these receptacles to run out, reciprocates the slide back to its normal position shown in Fig. 3. The shaft T carries also a cam $u$ (Fig. 3) which imparts the rising and falling movements to the dumping ring L, and a cam $v$ which imparts the rising and falling movements to the stop-ring P. The cam $u$ acts through a lever $u'$ fulcrumed on the shaft $t^2$, which through a link $u^2$ engages a vertical slide L' (Fig. 4), from which project rigid arms $L^2$ carrying the ring L. The cam $v$ (Fig. 6) acts through a lever $v'$ fulcrumed at $v^2$ and engaging at its opposite end a grooved hub P' guided on the shaft M, which moves freely through it, and connected by arms $P^2$ to the ring P, so that the rising and falling movements imparted to it by the lever $v'$ cause it to raise and lower the ring with the movement already described. The dumping arm $m$ projects rigidly from a vertically movable slide $m'$, which is connected by a link $m^2$ to a lever $m^3$ carrying a roller which is engaged in the cam-groove of a cam $w$ (Fig. 2) fixed on the shaft S'. At the instant when the ten scale-pans are simultaneously dumped into the ten receptacles or carriers K, one of these receptacles stands in the dumping position over the delivery chute N. In order that the dumping of the charges shall occur at regular intervals, it is necessary that the carrier which receives its charge in this position shall dump it down the chute N before the next forward movement, the other nine carriers however serving to retain and store their charges and to be dumped successively. It is obvious that this one receptacle or carrier which at the instant of dumping the scale stands over the chute N might be omitted, thereby permitting the scale-pan to dump this charge directly down the chute N. In my present construction this result is accomplished in substance by the construction of the receptacle K which receives the charge in this position, and which in Fig. 1 is lettered $K^3$, with a permanently open mouth $w'$, so that the charge dumped into it will immediately fall through it, the receptacle $K^3$ consequently serving merely as a chute or open-bottomed hopper for receiving the charge and directing it down the chute N, but not for storing it. Obviously, however, the receptacle $K^3$ being constructed the same as the other receptacles with a lug $k^3$ to be lifted by the arm $m$, will be opened by the action of such arm in the dumping position, so that the charge dumped into it from the scale-pan above would inevitably fall immediately through it. But for practical reasons involved in the mechanical construction of the machine, it is desirable to give this receptacle $K^3$ a longer period during which it may discharge the material dumped into it than that coincident with the opening of the successive receptacles by the arm $m$, since by so doing the timing of the several moving parts may be better effected, and the dumping of the scale-pans may be performed more slowly and gradually, so that the operation of discharging their contents may be prolonged until after the arm $m$ shall have restored the receptacle $K^3$ upon which it is acting to its normal condition. This is made possible by the provision of the opening $w'$. The projecting lug $k^3$ might be omitted from this receptacle $K^3$, so that in the dumping position the rising and falling of the arm $m$ would not affect this receptacle, which would serve consequently solely as a chute or hopper through which the charge dumped from the pan might slide immediately into the delivery chute N.

As before stated, the most important improvement introduced by my present invention is the substitution of the annular sliding plate H with its openings $h\ h$ for the several gates or false bottoms located in the chutes I I leading down from the respective receptacles E E. This construction greatly simplifies the machine by reducing the number of moving parts, and in addition has the advantage of being less liable to get out of order or be broken. With the gate shown in my said former application, if by accident a stick or twig were to be fed in with the charge of coffee or other material being subdivided into weighed charges, it would fall down the chute I, and upon the dumping thereof might not fall entirely through, but would remain within this chute and obstruct the closing of its gate, thereby bending or breaking the latter and doing perhaps other damage; but with my improved construction the plate H being made of strong material, as steel, and being driven by a powerful cam motion, will serve to shear through any obstruction that is at all likely to find its way into the machine with the material under treatment.

In the preferred construction shown, the annular plate H is mounted directly beneath a bottom plate H' forming the bottom support for the receptacles E E, this plate being fixedly mounted on the framework, and having an internal flange $y$ turned downwardly to form an inner bearing or journal on which the plate H turns. The plate H' is preferably attached at its inner side directly to the upper margin or rim of the feed hopper F as shown.

It must not be inferred from the full description and illustration that I have given of all the details of the machine that my present invention is necessarily limited in its application to a machine possessing all the detail features shown and described, as many of the features of construction are wholly immaterial to my present invention, and might be substituted by other constructions for the same or similar purposes, or might be omitted altogether, without thereby departing from my invention. Those features which are believed to be essential to my present invention are defined in the claims.

The arrangement of the receptacles E E in circular order, and the corresponding construction of the slide H as an annular plate, are not deemed essential to my present invention.

I claim as my invention the following-defined novel features, substantially as hereinbefore specified, namely:

1. The combination with a series of scales and a corresponding series of stationary receptacles arranged to receive charges of the material to be weighed and deliver them into the scale-pans, of a movable slide beneath the receptacle having openings registering with the respective receptacles, and movable to bring said openings out of register therewith to close the receptacles, or to bring said openings into register therewith to discharge the receptacles.

2. The combination with a series of scales and a corresponding series of receptacles arranged to receive successive charges of the material to be weighed and deliver them simultaneously into the scale-pans, and a measuring device delivering the charges into said receptacles successively, of a movable slide having openings registering with the respective receptacles and movable to bring said openings out of register therewith to close the receptacles and to bring them into register therewith to discharge the receptacles.

3. The combination with a series of scales and a corresponding series of stationary receptacles arranged to receive charges of the material to be weighed and deliver them into the scale-pans, of a movable slide beneath the receptacles having openings registering with the respective receptacles, and movable to bring said openings out of register therewith to close the receptacles, or to bring said openings into register therewith to discharge the receptacles, and a revolving cam for reciprocating said slide at intervals.

4. The combination with a series of scales and a corresponding series of receptacles arranged to receive successive charges of the material to be weighed and deliver them simultaneously into the scale-pans, and a measuring device delivering the charges into said receptacles successively, of a movable slide having openings registering with the respective receptacles and movable to bring said openings out of register therewith to close the receptacles and to bring them into register therewith to discharge the receptacles, and driving mechanism for operating said measuring device and slide, constructed to operate the former as many times in succession as there are scales, and upon the termination of the series of operations, by which all said receptacles are charged, to operate said slide to simultaneously dump said receptacles, and immediately thereafter to restore said slide.

5. The combination with a circular series of scales and a corresponding series of circularly arranged receptacles adapted to receive charges of the material to be weighed, and a series of chutes leading downward from the respective receptacles and adapted to discharge the material therefrom into the scale-pans, of a movable slide consisting of an annular plate having openings registering when in one position of the plate with the respective receptacles, arranged between said receptacles and their chutes, and movable to bring said openings out of register with the receptacles to close the latter, or to bring them into register therewith to simultaneously discharge the receptacles.

6. The combination with the series of scales of a circularly arranged series of receptacles E E, an annular bottom plate H' therefor, having holes under the respective receptacles and a movable slide H consisting of an annular plate mounted to oscillate beneath said bottom plate and having openings registering with the bottom openings of the respective receptacles whereby its movement simultaneously opens or closes the bottom openings thereof.

7. In an automatic weighing machine, the combination with a scale and mechanism for dumping a charge into its pan, of a fixed stop for limiting the descent of the pan, and a movable stop moving to engage the scale-beam and hold it against said fixed stop, and remaining stationary to hold it there until the dumping of the charge into the pan and subsequently retracting to release the beam and permit the scale to weigh the charge.

8. In an automatic weighing machine, the combination with a scale, mechanism for dumping the weighed charge from its pan, and mechanism acting subsequently thereto for dumping a charge into its pan, of a fixed stop for limiting the descent of the pan, and a movable stop moving down before the dumping of the charge from the pan to hold the scale-beam against said fixed stop, remaining stationary to hold it there during the dumping of the pan and until the dumping of the new charge into the pan commences, and moving subsequently slowly upward to gradually release the scale.

9. In an automatic weighing machine, the combination of a series of scales, mechanism for dumping the weighed charges from the scale-pans, and mechanism acting subsequently thereto for dumping charges of the material to be weighed simultaneously into the scale-pans, of a series of fixed stops for limiting the descent of the pans, and a vertically movable stop-ring P, and driving mechanism for raising and lowering it adapted to move it down before the dumping of the charge from the pan to force the scale-beams down until held against said fixed stops, to hold it stationary there during the dumping of the pans, and during the dumping of the new charges into the pans, and to subsequently move it slowly upward to gradually release the several scales.

10. In an automatic weighing machine, the combination with a series of scales, mechanism for dumping the scale-pans, and mechanism for subsequently dumping the charges into the pans, of fixed stops for limiting the descent of the pans, and a vertically movable stop-ring P connected to a vertically sliding hub P', and driving mechanism for said ring consisting of a cam $v$, and a lever $v'$ for transmitting motion from said cam to said hub.

11. In an automatic weighing machine, comprising the combination of a series of scales, mechanism for dumping the scale-pans simultaneously, a revolving series of carrier receptacles beneath the scales arranged to receive the charges dumped from the scale-pans, a delivery chute, and mechanism for dumping the carriers in succession as they reach said chute, the construction of the one of said carrier receptacles which stands over said chute at the instant of dumping the scales with a permanent discharge opening $w'$ whereby said carrier receptacle constitutes essentially a hopper or chute through which the charge dumped from the scale-pan descends directly into the delivery chute independently of the operation of the dumping mechanism.

In witness whereof I have hereunto signed my name in the presence of two subscribing witnesses.

HENRY E. SMYSER.

Witnesses:
ALLYN A. LOWN,
JAMES J. FROST.